(12) United States Patent
Vogler et al.

(10) Patent No.: US 12,447,695 B2
(45) Date of Patent: Oct. 21, 2025

(54) COMPENSATION FOR THERMAL DEFORMATION ON SONOTRODES

(71) Applicant: HERRMANN ULTRASCHALLTECHNIK GMBH & CO. KG, Karlsbad (DE)

(72) Inventors: Ulrich Vogler, Uhldingen-Mühlhofen (DE); Stefan Zendler, Straubenhardt (DE)

(73) Assignee: Herrmann Ultraschalltechnik GmbH & Co. KG, Karlsbad (DE)

( * ) Notice: Subject to any disclaimer, the term of this patent is extended or adjusted under 35 U.S.C. 154(b) by 190 days.

(21) Appl. No.: 18/256,178

(22) PCT Filed: Dec. 7, 2021

(86) PCT No.: PCT/EP2021/084560
§ 371 (c)(1),
(2) Date: Jun. 6, 2023

(87) PCT Pub. No.: WO2022/122720
PCT Pub. Date: Jun. 16, 2022

(65) Prior Publication Data
US 2024/0034004 A1   Feb. 1, 2024

(30) Foreign Application Priority Data
Dec. 10, 2020  (DE) .................. 102020133013.8

(51) Int. Cl.
*B29C 65/00* (2006.01)
*B29C 65/08* (2006.01)

(52) U.S. Cl.
CPC .......... *B29C 66/8145* (2013.01); *B29C 65/08* (2013.01)

(58) Field of Classification Search
CPC ............................ B29C 66/8145; B29C 65/08
See application file for complete search history.

(56) References Cited

U.S. PATENT DOCUMENTS 3,254,402 A * 6/1966 Balamuth ............... B29C 65/08
                                                      228/171
5,775,055 A   7/1998 Giacomelli et al.
(Continued)

FOREIGN PATENT DOCUMENTS

CA   3018946 A1   10/2017
CN   1875194 A    12/2006
(Continued)

OTHER PUBLICATIONS

Machine translation of WO 2012107522; Publicaiton date: Aug. 16, 2012; Inventor: Thomas Herrmann.*
(Continued)

*Primary Examiner* — Vishal I Patel
(74) *Attorney, Agent, or Firm* — Greer, Burns & Crain, Ltd.

(57) ABSTRACT

A sonotrode for an ultrasonic welding apparatus, having a lower portion of length u and an upper portion of length o, the upper portion and the lower portion adjacent on a longitudinal axis of the sonotrode, and the total length of the sonotrode in the direction of the longitudinal axis being u+o, the lower portion having a sealing surface oriented perpendicular to the longitudinal axis, the sealing surface contacting a material to be processed. The lower portion has a slot, wherein the slot extends from the sealing surface to a side of the lower portion opposing the sealing surface, such that the lower portion of the sonotrode is divided into a plurality of segments which lie adjacent each other in a direction perpendicular to the longitudinal axis.

19 Claims, 6 Drawing Sheets

(56) References Cited

U.S. PATENT DOCUMENTS

| | | | | |
|---|---|---|---|---|
| 6,605,178 | B1* | 8/2003 | Shinohara | B29C 66/8145 |
| | | | | 156/580.2 |
| 2007/0102094 | A1 | 5/2007 | de Groot | |
| 2010/0282395 | A1 | 11/2010 | Volger et al. | |
| 2013/0306219 | A1 | 11/2013 | Herrmann et al. | |
| 2017/0297754 | A1 | 10/2017 | Matheny et al. | |
| 2018/0339461 | A1* | 11/2018 | Aurand | B29C 66/43121 |

FOREIGN PATENT DOCUMENTS

| | | | |
|---|---|---|---|
| CN | 1990215 | A | 7/2007 |
| CN | 101952108 | A | 1/2011 |
| CN | 102501006 | A | 6/2012 |
| CN | 206998028 | U | 2/2018 |
| CN | 207643741 | U | 7/2018 |
| DE | 1957216 | A | 5/1971 |
| DE | 202005003067 | U1 | 5/2005 |
| DE | 102005022179 | A1 | 12/2005 |
| DE | 102007060442 | A1 | 6/2009 |
| DE | 102008059142 | A1 | 6/2010 |
| EP | 1009618 | B9 | 7/2004 |
| JP | 2004255580 | A | 9/2004 |
| JP | 2005343496 | A | 12/2005 |
| JP | 2012074565 | A | 4/2012 |
| WO | 2012107522 | A1 | 8/2012 |

OTHER PUBLICATIONS

Branson Ultrasonics, Ultrasonic Horn Catalog (Year: 2014).*
International Search Report for corresponding International Patent Application No. PCT/EP2021/084560 dated Mar. 29, 2022; priority document.
German Search Report for corresponding German Patent Application No. 102020133013.8 dated Jun. 15, 2021; priority document.
Dukane Corp., "Sonotrodes", https://www.dukane.com/de/kunststoffschweismaschinen/ultraschallwerkzeuge, Apr. 1, 2020.
Pllm Derks: "The Design of Ultrasonic Resonators with Wide Output Cross-Sections" Jan. 1, 1984, https://pure.tue.nl/ws/files/3292148/34306.pdf.
Anonymous, "Ultrasonic Horns" May 31, 2019, https://www.heatstaking.com/ultrasonic-horns.
Emerson Industrial Automation: "Horn Catalog Ultrasonic Horn Catalog 2 Contents" Sep. 26, 2019, https://www.emerson.com/documents/automation/catlaog-ultrasonic-horn-branson-en-us-160126.pdf.
Branson Ultrasonics, Ultrasonic Horn Catalog, Jul. 2014.
Dukane, What is the right material for making Ultrasonic Horns?, https://www.dukane.com/blog/221/06/28/utrasonic-welding-horn-material/, Jun. 28, 2021.
International Preliminary Report on Patentability for corresponding International Patent Application No. PCT/EP2021/084560 dated Jun. 15, 2023—English Translation; priority document.

* cited by examiner

COMPENSATION FOR THERMAL DEFORMATION ON SONOTRODES

CROSS-REFERENCES TO RELATED APPLICATIONS

This application is a national phase of International Patent Application No. PCT/EP2021/084560, filed on Dec. 7, 2021, which claims the benefit of German Patent Application No. 10 2020 133 013.8, filed on Dec. 10, 2020, the entire disclosures of which are incorporated herein by way of reference.

FIELD OF THE INVENTION

The present invention relates to a sonotrode for an ultrasonic welding apparatus, having a lower portion of length u and an upper portion of length o, the upper portion and the lower portion being arranged adjacent to each other on a longitudinal axis of the sonotrode, and the total length of the sonotrode in the direction of the longitudinal axis being u+o, the lower portion having a sealing surface oriented perpendicular to the longitudinal axis, the sealing surface is intended to come into contact with a material to be processed.

BACKGROUND OF THE INVENTION

Ultrasonic welding has been an established method for some time when it comes to form-locking or material-locking thermoplastics to each other. Applications range from the automotive and electrical industries to the packaging, medical, and hygiene industries.

Typical ultrasonic welding apparatuses have an ultrasonic generator, a converter, optionally an amplitude transformer, and a welding tool, which is referred to as the sonotrode. The ultrasonic generator generates a high voltage in the desired ultrasonic frequency from an applied supply voltage. The electrical oscillation of the ultrasonic generator is then converted into a mechanical longitudinal oscillation utilizing the inverse piezoelectric effect in the converter and transferred to the amplitude transformer or welding tool. The amplitude of the mechanical vibration can be increased or decreased with the aid of the amplitude transformer, which is optionally arranged between the converter and the welding tool. In addition, the amplitude transformer can also serve to support the oscillating arrangement consisting of the converter, amplitude transformer, and welding tool. The sonotrode finally transfers the mechanical vibration into the components to be joined as an actual, active welding tool. The sonotrode has a sealing surface, via which the sonotrode comes into contact with the material to be processed.

The mechanical vibration with frequencies in the ultrasonic range generates frictional heat in the plastic to be joined and stimulates the molecules in the plastic to move. As a result, the plastic becomes soft and begins to melt, so that the components to be joined together connect when a certain pressure is applied to the components over a period of time. The components are then fixedly connected to each other at the molecular level.

The properties of the welded joint in terms of strength, tightness and optical impression will depend on various factors during ultrasonic welding. On the one hand, the frequency and the amplitude of the vibration used during welding plays a role and, on the other hand, the duration and the applied weld force also affects the final result of the weld. In addition, the weld result also depends on the geometrical or spatial shape of the welding tool. The shape of the welding tool is therefore already selected in advance such that a certain welding result is achieved, e.g., with regard to the optical impression.

However, the shape of the welding tool, i.e. the sonotrode, can also change during the welding process. During the welding process, there are temperature differences within the sonotrode that result in uneven thermal expansion of the sonotrode material. This leads to sealing surfaces which are partially convex and have a significant impact on the weld result, depending on the material being welded. In particular, homogeneous welding of very thin layers of material, e.g. nonwovens, used in the medical industry or in hygiene products, is therefore quite limited. During production, there are fluctuations in results of both the strength of the joint and the optical impression of the weld joint. This is due to the fact that, when welding very thin layers of material, a spacing between the welding tool and an opposing tool, between which the layers of material are arranged, must be selected to be correspondingly small in order to achieve welding. If this spacing measures, e.g., only in the range of a few micrometers, then the deformation of the sealing surface of the sonotrode, which also measures only in the range of a few micrometers, results (relatively speaking) in a significant local change in the spacing between the welding tool and the counter-tool. In some regions, too little pressure is therefore applied to the materials to be joined, whereas in other regions too much pressure is applied.

In order to solve or minimize this problem, it is known from the prior art to concavely grind the sealing surfaces in contact with the material to be processed. The concave depression in the sealing surface is then lifted by the convex thermal expansion of the sonotrode material, so that a flat sealing surface and thus a homogeneous weld are achieved during operation of an ultrasonic welding apparatus.

The disadvantage of this solution is that the deformation is ideally compensated for only at a very specific operating point of the ultrasonic welding apparatus. When starting the ultrasonic welding apparatus from a cold state, or when the tool is heated to a greater extent than originally planned, this optimal operating point is not reached, so homogeneous welding is also not achieved.

In order to still achieve a processing result that is as reproducible as possible, a strong air cooling of the sonotrode is often used as an alternative or in addition to this solution in order to keep the excessive heating or deformation as low as possible. Furthermore, it is known to equip the sonotrode in the region of the sealing surface with cooling channels in order to keep the temperature of the sonotrode as constant as possible. However, a homogeneous welding of very thin materials cannot be guaranteed even in this manner.

SUMMARY OF THE INVENTION

An object of the present invention is therefore to provide a sonotrode for an ultrasonic welding apparatus, by means of which even very thin material layers can be welded together in high quality.

According to the present invention, this object may be achieved by means of a sonotrode of the aforementioned type, the lower portion having a slot, the slot extending from the sealing surface to a side of the lower portion opposite the sealing surface, such that the lower portion of the sonotrode is divided into a plurality of segments which lie adjacent to each other in a direction perpendicular to the longitudinal axis.

Said division of a lower portion of the sonotrode results in reducing the effect of thermal expansion, whereby the sealing surface, which is divided by means of the slots into a plurality of sealing surface portions, is not curved. In other words, all sealing surface portions lie in one plane, come into contact with the material to be welded at the same time, and exert the same pressure on the material to be welded. Even very thin material layers can be welded together, whereas a convex curvature of the sealing surface would lead to an unsatisfactory weld result.

In one embodiment, the sonotrode is designed such that u>0.25 o, preferably 0.8 o<u<1.5 o, and more preferably 0.95 o<u<1.1 o. Ideally, the length o of the upper portion essentially then corresponds to the length u of the lower portion.

In this case, if the total length o+u of the sonotrode corresponds to the direction of the longitudinal axis of a wavelength λ, at which wavelength the sonotrode is excited during an ultrasonic welding process, this results in the boundary between the upper portion and the lower portion running within the range of a vibration node of the excitation vibration. The arrangement of the boundary between the slotted lower portion and the upper portion in a vibration node has the advantage of this being a low stress and low strain region. Tensions between the individual segments are thus reduced on the one hand, but the influence of the segments on the overall oscillation behavior of the sonotrode is also minimized. As a result, the slots in the lower portion have almost no effect on the vibration transmitted to the material.

The slots according to the invention being in the lower portion of the sonotrode minimize the thermal deformation of the sealing surface on the one hand and, at the same time, do not significantly affect the vibrational behavior of the sonotrode, so the overall welding result is optimized.

In a further embodiment, the sealing surface is bordered by two opposing side surfaces of the sonotrode which extend parallel to one another, and the slot in the region of the sealing surface forms an angle of <90°, and preferably an angle of between 80° and 87°, with the two side surfaces of the sonotrode.

The arrangement of the slots at an angle to the side surfaces of the sonotrode, which are arranged perpendicular to a feeding direction of the material during the welding process, results in an even welding result being achieved over the whole width of the sonotrode. The width of the sonotrode is understood to mean the extent of the sonotrode that comes into contact with the material to be processed simultaneously during a welding operation, and thus corresponds to the width of the material being processed simultaneously during a welding operation. If the slots were arranged perpendicular to the side surfaces, i.e., parallel to the feeding direction, this would result in the sealing surface having regions in which no welding takes place. This would affect the tightness and the visual impression of the weld joint achieved. However, given the arrangement of the slots at an angle to the side surfaces, welding takes place over the entire width of the sonotrode.

In this embodiment, the entire slot need not necessarily be arranged at an angle. It is sufficient if only a lower part of the slot adjoining the sealing surface is arranged at an angle. Such a design offers the advantage that it is easier to manufacture in terms of manufacturing technology.

In a further embodiment, the slot has two support walls, with a spacing between the support walls tapering towards the sealing surface, the tapering preferably being stepped, and the spacing at the sealing surface particularly preferably being less than or equal to 1 mm, preferably less than or equal to 0.5 mm, and more preferably less than or equal to 0.3 mm.

The tapering of the slots towards the sealing surface offers the advantage that, when viewed from a surface perspective, only a small region of the sealing surface is interrupted by the slots. As a result, the effect of the slots on the weld result is minimized to the degree possible (apart from the compensation of the thermal expansion).

In a further embodiment, an end of the slot facing away from the sealing surface has a widening, the sealing surface preferably being bordered by two opposing side surfaces of the sonotrode which extend essentially parallel to one another, and the widening being circular when viewed on a plane of the two opposing side surfaces of the lower portion.

Such a widening provides the advantage that stresses that may build up between the segments due to the vibration of the sonotrode and thermal deformation is reduced.

In a further embodiment, a further widening is additionally arranged in the region of the stepwise tapering of the slot. Said further widening, like the widening at the end of the slots facing away from the sealing surface, preferably has a circular cross-section on a plane of the two opposing side surfaces of the sonotrode. This arrangement also counteracts the tensions between the individual segments.

In a further embodiment, the sealing surface is bordered by two opposing side surfaces which extend essentially parallel to one another and by a front surface and a rear surface of the sonotrode, a width of the lower portion between the front and rear surfaces essentially corresponding to a width of the upper portion between the front surface and the rear surface.

In other words, in this embodiment at least one dimension of the upper and lower portions is selected to be essentially identical in the lower and upper portions. Since preferably also the lengths u and o of the upper and lower portion in the direction of the longitudinal axis are essentially identical, the widenings of the upper and lower portion in two dimensions essentially coincide with one another.

In one embodiment, the widening is, in a third dimension between the opposing surfaces extending essentially parallel to one another, smaller in the lower portion than in the upper portion. In other words, the sonotrode tapers towards the sealing surface in the lower portion.

In a further embodiment, a widening of the sonotrode in the lower portion, both between the front surface and the rear surface and between the opposing side surfaces extending essentially parallel to each other, is less than in the upper portion. In this embodiment, the sonotrode tapers in two dimensions towards the sealing surface.

In a further embodiment, the number of slots, and thus a width of the individual segments, is selected such that the convex thermal deformation of the sonotrode in the region of the sealing surface is less than 3 µm, preferably less than 2 µm. This deformation is measured in a direction parallel to the longitudinal axis between the edge of the sealing surface and the extent of the sonotrode in the middle of the sealing surface.

In a further embodiment, the lower portion comprises a plurality of slots, each slot comprising two slot walls, a width of the segments between two adjacent slot walls of two adjacent slots being at most (u+o)/3, preferably (u+o)/4, and more preferably (u+o)/6.

It is understood that, even in an embodiment with only one slot, the width of the segments between a slot wall and the front or rear surface of the sonotrode can also be at most (u+o)/3, preferably (u+o)/4, and more preferably (u+o)/6.

The number of slots thus depends on the overall width of the sonotrode between the front and rear surfaces of the sonotrode and the length u of the lower portion as well as the length o of the upper portion. Since the lengths u and o of the upper and lower portion are preferably selected as a function of the wavelength at which the sonotrode is excited, the number of slots thus depends on the overall width of the sonotrode and the wavelength of the exciting ultrasonic vibration.

The number of slots in total affects the vibrational response of the sonotrode. The number of slots must therefore be selected so that sufficient compensation of the thermal deformation is achieved on the one hand, but the vibrational behavior of the sonotrode itself is influenced as little as possible on the other hand.

In a further embodiment, the sealing surface is bordered by two side surfaces of the sonotrode which extend essentially parallel to one another, and bordered by a front surface and a rear surface of the sonotrode, the front surface being arranged, at least on the sealing surface, at an angle of <90° to the two opposing side surfaces, the rear surface also preferably being arranged, at least on the sealing surface, at an angle of <90° to the two opposing side surfaces.

The arrangement of the front and preferably the rear surface at an angle <90° to the two opposing side surfaces offers the advantage that several of the sonotrodes according to the invention can be arranged adjacent to one another in order to increase the processing width of an ultrasonic welding apparatus without disrupting the weld in the direction of the processing width. The angular arrangement of the front and rear surfaces is therefore based on the same consideration as the angular arrangement of the slots in the lower portion of the sonotrode. In particular, it is also not necessary in this case that the entire front or rear surface extend at a certain angle to the two opposing side surfaces. Instead, only the arrangement of the front and rear surfaces in the region of the sealing surface is of importance. Regions of the front and back surfaces not directly adjoining the sealing surface can also be arranged at any other angle to the two opposing side surfaces.

In a further embodiment, the upper portion of the sonotrode comprises at least one gap, the gap not being arranged along an extension of the slot of the lower portion, and/or the gap having a gap width that is larger than a spacing of the slot walls of the slot.

The introduction of gaps into the upper portion of the sonotrode has the advantage that the vibrational behavior of the sonotrode, and also the expansion of the sonotrode, is kept stable during the excitation with the ultrasonic vibration towards the processing width. If a sonotrode is excited with an ultrasonic vibration, the sonotrode also expands in a direction perpendicular to the direction of feeding of the material, i.e., in the processing width. This effect is already clearly evident when the width of the sonotrode exceeds one third of the exciting wavelength of the ultrasonic vibration.

Since these gaps, unlike the slots in the lower portion, are not intended to compensate for thermal deformation, but merely for deformation due to the ultrasonic vibration, the gaps can on the one hand be shaped differently, e.g. wider, independently of the slots on the other hand. In particular, there is no connection between the slots of the lower portion and the gaps of the upper portion.

In a further embodiment, a support for supporting the sonotrode in an ultrasonic welding apparatus is provided, the support being arranged on the segments of the lower portion of the sonotrode.

The support of the sonotrode on the segments of the lower portion offers the advantage that the vibrational behavior of the sonotrode is essentially not affected by said support. If the support is placed in a region where the vibration amplitude is lowest, then the position of the sonotrode will need little readjustment in order to maintain a constant processing spacing between the sonotrode and the material to be processed.

Given arrangement of the support on the segments in the lower portion, the effect of thermal deformation is also lower, because there is less sonotrode material between the support and the material to be processed, which can thermally expand. In addition, the thermal expansion is compensated for in the lower portion by the slots, so that the position of the sonotrode relative to the material to be processed can be readjusted within a significantly smaller range or not at all, depending on the application.

The problem underlying the invention is further solved by a method for ultrasonic processing of a material, the method comprising the following steps:
a) providing a sonotrode according to one or more embodiments described herein,
b) providing a counter-tool having a sealing surface,
c) arranging the material between the sealing surface of the sonotrode and the sealing surface of the counter tool,
d) exciting the sonotrode with an ultrasonic oscillation of wavelength λ,
e) transferring the ultrasonic vibration to the material.

In a further embodiment of the method according to the invention, the following applies to the wavelength λ:

$$0.8(u+o)<\lambda<1.2(u+o) \text{ and preferably}$$

$$0.9(u+o)<\lambda<1.1(u+o).$$

Preferably, the total length u+o of the sonotrode in the direction of the longitudinal axis therefore essentially corresponds to the wavelength with which the sonotrode is stimulated. In this context the sonotrode is also called as a λ-sonotrode.

In one embodiment in particular, $0.4\lambda<u<0.6\lambda$ and preferably $\lambda/2=u$. In other words, the widening in the slots in a direction of the longitudinal axis corresponds to half of the wavelength. This also offers advantages regarding the oscillation behavior of the sonotrode since the slots terminate in an oscillation node of the ultrasonic oscillation. In this case, the slots have almost no influence on the vibrational behavior of the sonotrode and only compensate for the thermal deformation of the sonotrode.

In a further embodiment of the method according to the invention, during step e) the material is moved at a feed rate v>0 m/s between the sealing surface of the sonotrode and the sealing surface of the counter-tool.

By tuning the feed rate to the process of ultrasonic welding, a welding method is thus provided which can process tubular and strip-shaped materials in a clocked or continuous operation. The material to be processed is continuously guided through the welding tool and is determined as a function of the feed speed and the stroke or welding tool design at certain locations or continuously ultrasonically processed. Corresponding methods are used, e.g., in the packaging industry, whereby a tubular material into which a product is filled is welded and cut at certain intervals in order to individually package the product. Further areas of application are also found, e.g., in the processing of strip-shaped nonwoven fabrics, which are primarily processed in a continuous process in the hygiene industry.

BRIEF DESCRIPTION OF THE DRAWINGS

Further advantages, features, and possible applications of the present invention will become apparent from the following description of embodiments and the associated drawings. In the drawings, the same elements are identified using the same reference numbers.

FIG. 2b shows an enlargement of the marked region in FIG. 2a.

FIG. 3a shows a side view onto a side surface of the embodiment shown in FIG. 1.

FIG. 3b shows an enlargement of the region marked in FIG. 3a.

DETAILED DESCRIPTION OF THE PREFERRED EMBODIMENTS

Figure 1:
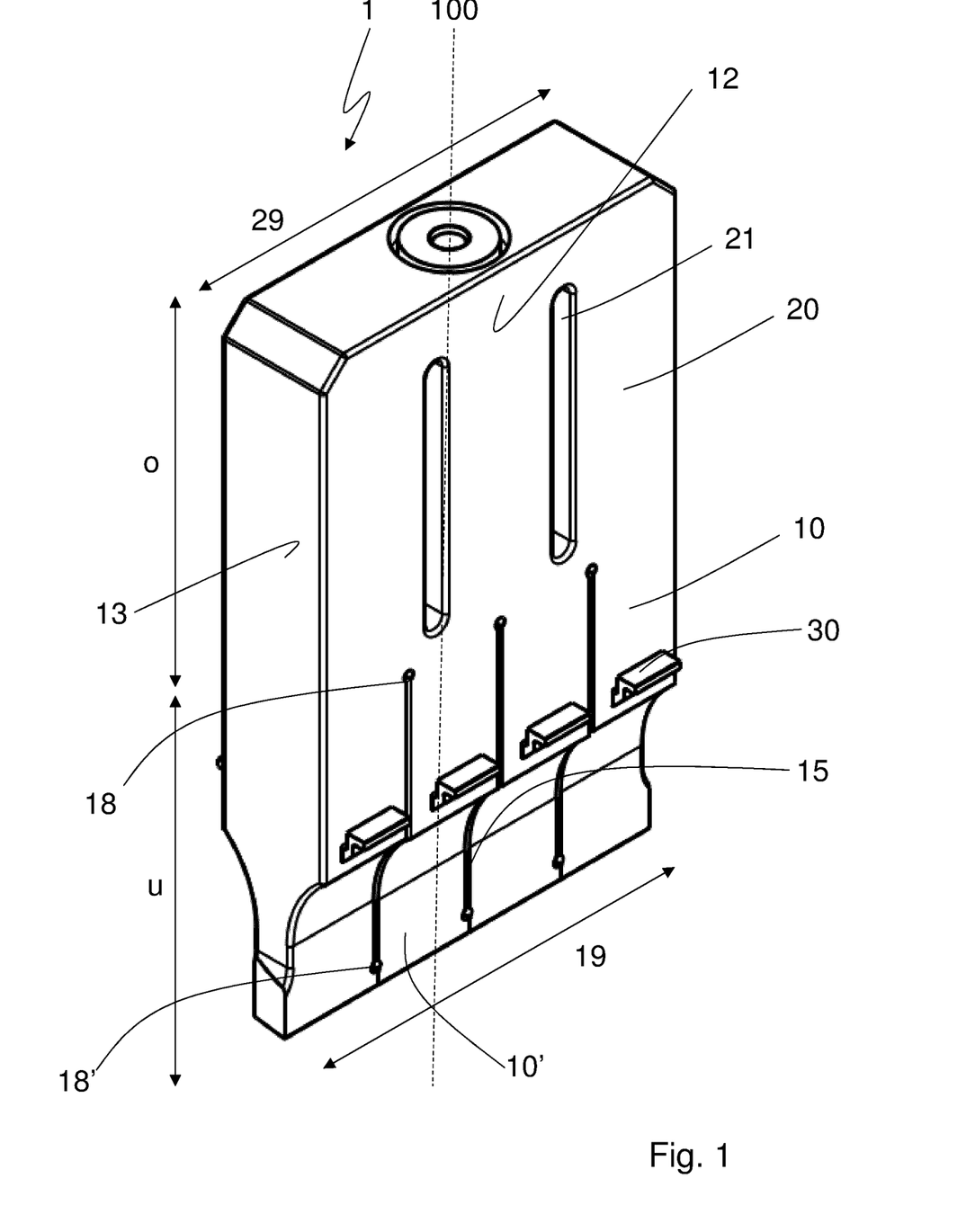
FIG. 1 is a schematic view of a first embodiment according to the invention.

The embodiment of the sonotrode 1 according to the invention for an ultrasonic welding apparatus shown in FIG. 1 can be divided into a lower portion 10 of the length u and an upper portion 20 of the length o. The upper portion 20 and the lower portion 10 are arranged adjacent each other on a longitudinal axis 100 of the sonotrode 1. The total length of the sonotrode 1 in the direction of the longitudinal axis 100 is u+o. In addition, the length u of the lower portion 10 corresponds to the length o of the upper portion 20. Moreover, a width 19 of the lower portion 10 corresponds to a width 29 of the upper portion 20.

Figure 4:
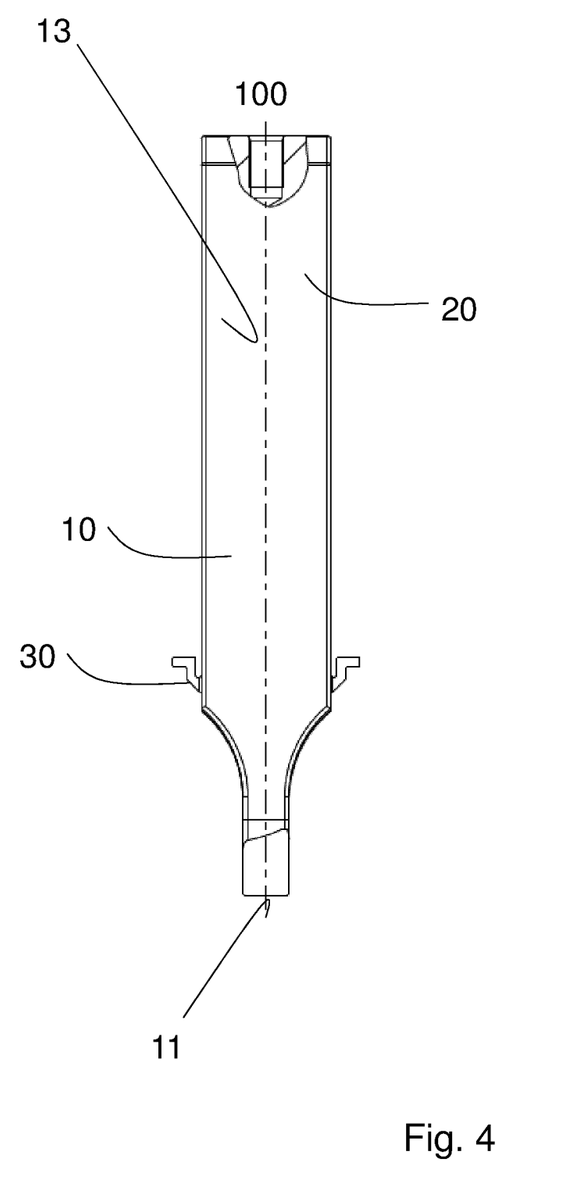
FIG. 4 shows another side view onto the front surface of the embodiment shown in FIG. 1.

It can be seen from FIG. 4 that the front surface 13 tapers towards the sealing surface 11. A widening of the sonotrode 1 in the upper portion 20 and in an upper region of the lower portion 10 on a plane of the front surface 13 is therefore larger than a widening of a lower region of the lower portion 10, which adjoins the sealing surface 11. The rear surface 14 is designed in the same way as the front surface 13.

Figure 2A:
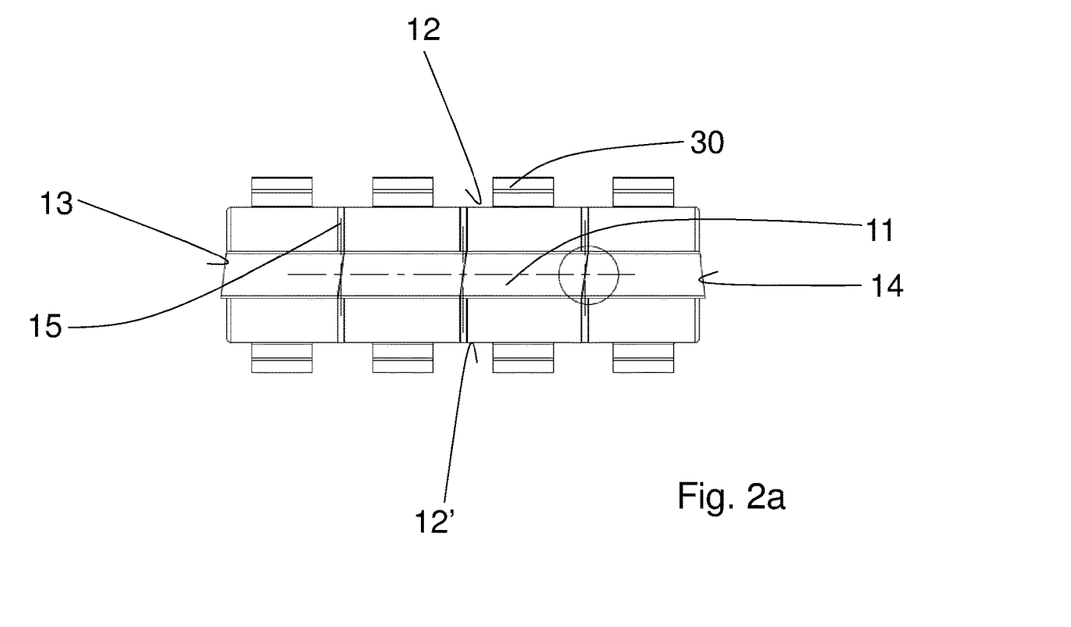
FIG. 2a shows a top plan view of the sealing surface of the embodiment shown in FIG. 1.

Furthermore, the lower portion 10 has a sealing surface 11 oriented perpendicular to the longitudinal axis 100, the sealing surface is shown in FIG. 2a. The sealing surface 11 is provided to come into contact with a material 40 to be processed (see FIG. 6). The width 19 corresponds to the width at which an ultrasonic processing of the material 40 takes place by means of the sonotrode 1 according to the invention.

The lower portion 10 of the sonotrode 1 comprises three slots 15, the slot 15 extending from the sealing surface 11 to one of the sides of the lower portion 10 opposite the sealing surface 11. The slot 15 has two slot walls, which are spaced from one another at a spacing 17 (see FIG. 2b).

Figures 3A, 3B:
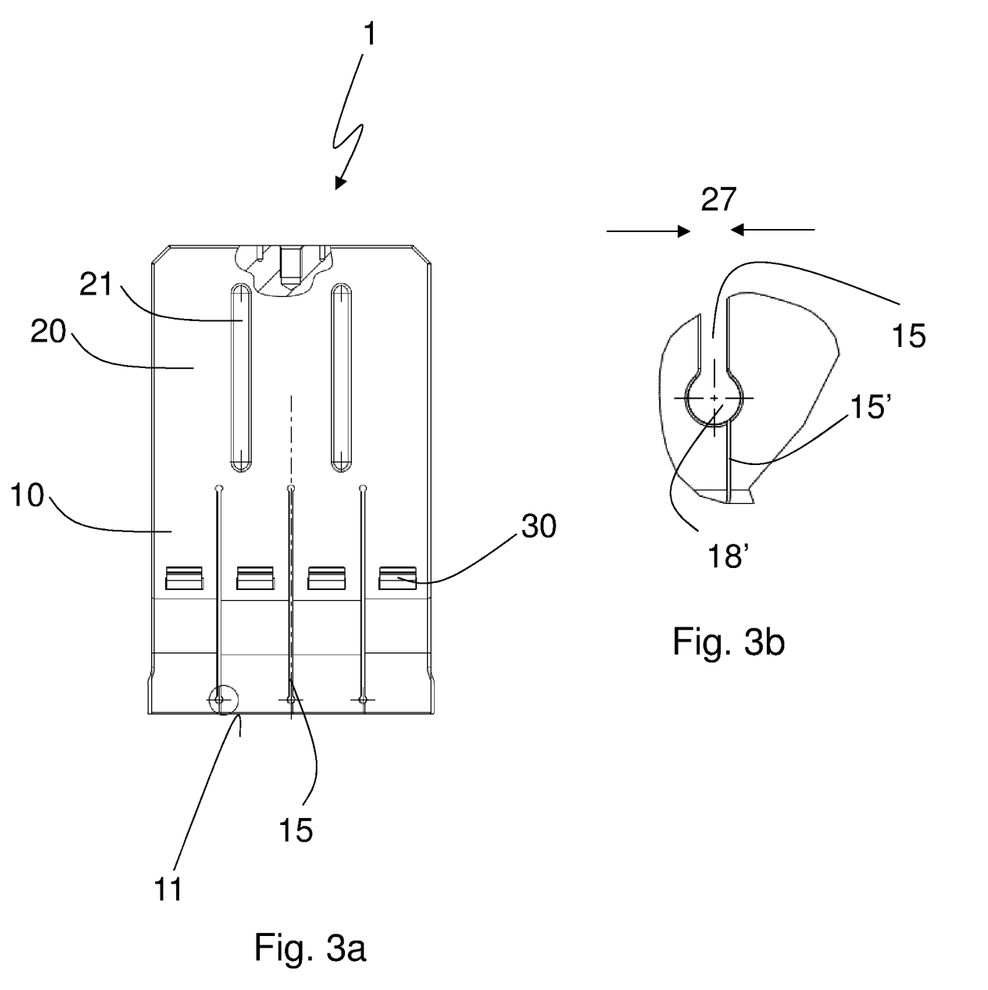

Based on FIG. 3b, it can also be seen that the slot 15 faces the sealing surface 11, with the tapering taking place in a stepwise manner. Arranged in the region of stepped tapering is a widening 18', which has a circular cross-section on a plane of the side surface 12. The spacing of the slot walls in the region 15' of the slot 15 arranged between the widening 18' and the sealing surface 11 is also significantly less than a spacing 17 of the slot walls of the slot 15 above the widening 18'.

In addition to the widening 18' in the region of the stepped tapering, the slot has a further widening 18 which is arranged at an end of the slot 15 facing away from the sealing surface 11. The widening 18 also has a circular cross-section when viewed on a plane of the side surface 12 (see FIG. 3a).

By means of the widenings 18, 18', stresses that might form between the segments 10' during operation of the sonotrode 1 in an ultrasonic welding apparatus due to the vibrations and thermal expansion of the sonotrode material are avoided or at least reduced.

Figure 2B:
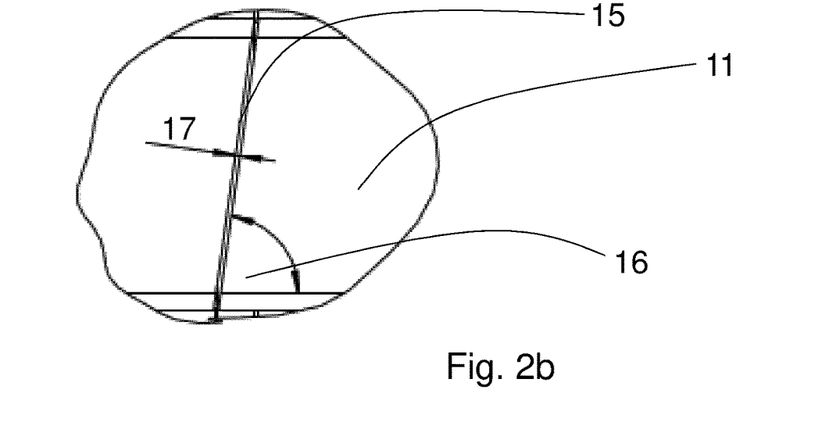

FIGS. 2a and 2b also show that the slots 15 in the region of the sealing surface 11 with the side surface 12 of the sonotrode 1 include an angle 16 of 81°. The side surfaces 12, 12' extend parallel to each other, they are arranged opposite each other, and they border the sealing surface 11 of the sonotrode 1. As shown in FIG. 3a, the slots 15 are only arranged in a small region 15' of a few millimeters from the sealing surface 11 in the direction of the longitudinal axis 100 at this angle 16 to the side surface 12. In the adjoining region in the direction of the longitudinal axis 100, the slots 15 are arranged perpendicular to the two side surfaces 12, 12'.

In addition, it can be seen from FIG. 2a that a front surface 13 and a rear surface 14 of the sonotrode 1, which surfaces border the sealing surface 11 in addition to the side surfaces 12, 12', are also arranged at an angle of <90° to the side surfaces 12. The sonotrode 1 according to the invention can thus be connected to further sonotrodes in order to increase the processing width of an ultrasonic welding apparatus.

By means of the slots 15, the lower portion 10 of the sonotrode 1 is divided into a plurality of segments 10' which lie adjacent to each other in a direction perpendicular to the longitudinal axis 100. The arrangement of the slots 15 in the lower portion 10 of the sonotrode 1 reduces thermal deformation of the sealing surface 11 so that a more homogeneous weld result is achieved over the width 19 of the lower portion 10.

In addition, two gaps 21 with a gap width 27 are arranged in the upper portion 20 (see FIG. 3a). The gaps 21 serve to minimize a widening of the sonotrode 1 in the width 29 of the upper portion 20 during operation of the sonotrode 1 in an ultrasonic welding apparatus.

As shown in FIGS. 1 and 3, the gaps 21 are arranged independently of the slots 15, i.e., not along an extension of the slots or along a common line, and they also have a greater gap width 27, since a different deformation effect of the sonotrode 1 is compensated for by the gaps 21 than by the slots 15.

Finally, the embodiment 30 shown in FIGS. 1-4 includes supports, which are arranged in a region of the segments 10' of the lower portion 10.

Figure 5:
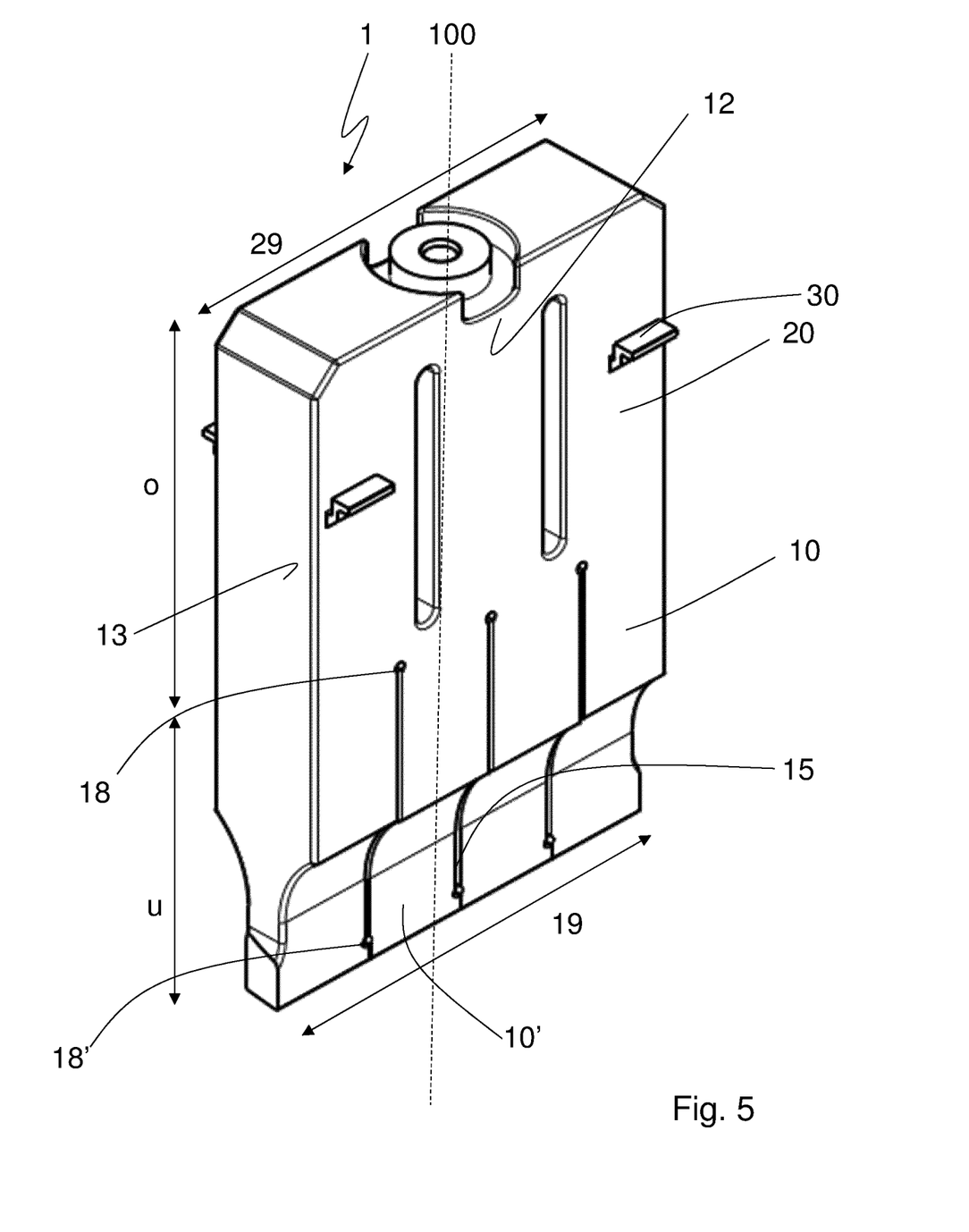
FIG. 5 shows a three-dimensional, schematic representation of a further embodiment of the sonotrode according to the invention.

The embodiment of the sonotrode 1 according to the invention shown in FIG. 5 differs from the embodiment shown in FIGS. 1-4 in that the supports 30 are not arranged in the lower portion 10, but in the upper portion 20.

Figure 6:
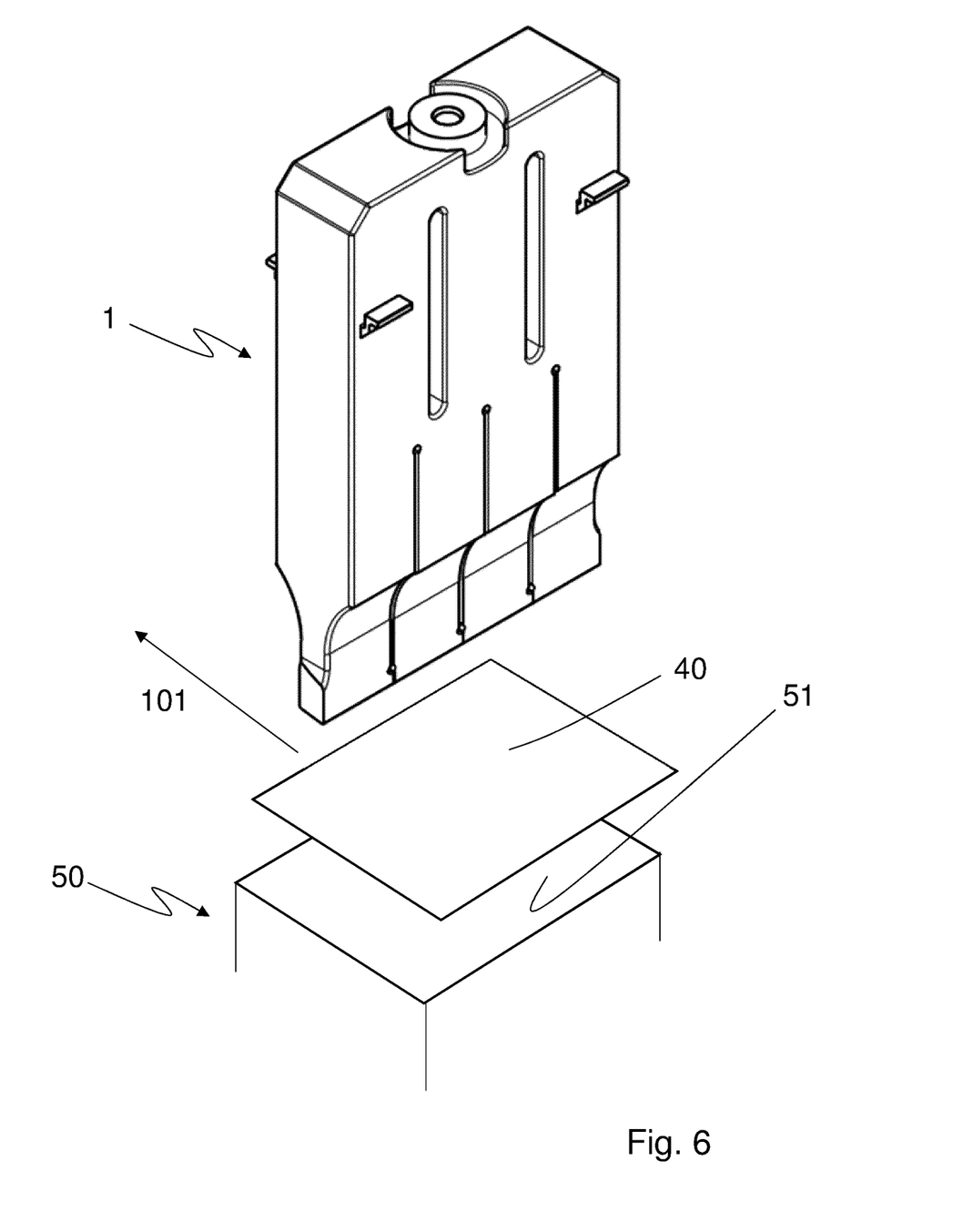
FIG. 6 shows a schematic representation of an embodiment of the sonotrode according to the invention in an ultrasonic welding apparatus.

In FIG. 6, the embodiment of the sonotrode 1 shown in FIG. 5 is shown schematically in an ultrasonic welding apparatus. Arranged between the sonotrode 1 and an opposing tool 50 is a material 40 to be processed. The material 40 moves at a feed rate v>0 m/s in a feed direction 101 between the sonotrode 1 and the counter tool 50.

During operation of the ultrasonic welding apparatus, the sonotrode 1 is excited with an ultrasonic vibration of wavelength λ and this ultrasonic vibration is transferred to the material 40 via the sealing surface 11. The material 40 is pressed by means of the ultrasonic vibration against a sealing surface 51 of the counter-tool 50, so that the transmitted ultrasonic vibrations process the material 40 ultrasonically. For example, the material 40 can be multiple layers of nonwoven fabric to be joined together in a bonded connection. Upon impact of the sonotrode 1 on the nonwoven fabric 40, the latter begins to melt due to the generated heat of friction and joins with a layer of material arranged beneath.

The overall length o+u of the sonotrode 1 is selected such that it essentially corresponds to the wavelength λ of the exciting ultrasonic vibration. In addition, the length of the slots 15, i.e., the length u of the lower portion 10, corresponds to half of the wavelength λ.

By selecting these dimensions, it is ensured that the slots 15 optimally compensate for the thermal deformation of the sealing surface 11, but, at the same time, the oscillating behavior of the sonotrode 1 is not significantly influenced. Even very thin layers of material 40 can thus be homogeneously welded together or generally processed using ultrasonic vibration by means of the sonotrode 1 according to the invention.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. By "essentially" it is meant that the value is within +/−10% or +/−5% or +/−1%.

This disclosure hereby incorporates by reference the complete disclosure of any patent or application from which it claims benefit or priority.

LIST OF REFERENCE NUMBERS

1 Sonotrode
10 Lower portion
10' Segments
11 Sealing surface of the sonotrode
12, 12' Opposing side surfaces which extend parallel to each other
13 Front surface
14 Rear surface
15 Slot
15' Portion of the slot arranged towards the sealing surface
16 Angle
17 Spacing of the slot walls
18, 18' Widening
19 Width of the lower portion
20 Upper portion
21 Gap
27 Gap width
29 Width of the upper portion
30 Support
40 Material
50 Counter-tool
51 Sealing surface of the counter-tool
100 Longitudinal axis
101 Feed direction

The invention claimed is:

1. A sonotrode for an ultrasonic welding apparatus, the sonostrode comprising:
a lower portion of length u and an upper portion of length o,
the upper portion and the lower portion being arranged adjacent to each other on a longitudinal axis of the sonotrode, and a total length of the sonotrode in a direction of the longitudinal axis being u+o,
the lower portion having a sealing surface oriented perpendicular to the longitudinal axis,
the sealing surface configured to contact with a material to be processed,
wherein the lower portion has a slot,
wherein the slot extends from the sealing surface to a side of the lower portion opposing the sealing surface, such that the lower portion of the sonotrode is divided into a plurality of segments which lie adjacent to each other in a direction perpendicular to the longitudinal axis, the slot having two slot walls, and a spacing between the two slot walls tapering in the direction of the sealing surface.

2. The sonotrode according to claim 1, wherein u >0.25o.

3. The sonotrode according to claim 1, wherein 0.8o<u<1.5o.

4. The sonotrode according to claim 1, wherein the sealing surface is bordered by two opposing side surfaces of the sonotrode which extend essentially parallel to each other, and the slot in a region of the sealing surface forms an angle of <90° with each of the two side surfaces of the sonotrode.

5. The sonotrode according to claim 1, wherein the tapering is stepped.

6. The sonotrode according to claim 5, wherein said spacing is less than or equal to 1 mm.

7. The sonotrode according to claim 1, wherein the slot has a widening on an end facing away from the sealing surface, and wherein the widening is circular when viewed on a plane of two opposing side surfaces of the sonotrode.

8. The sonotrode according to claim 1, wherein the sealing surface is bordered by two opposing side surfaces which are essentially parallel to each other, and bordered by a front surface and a rear surface of the sonotrode, wherein a width of the lower portion between the front surface and the rear surface essentially corresponds to a width of the upper portion between the front surface and the rear surface.

9. The sonotrode according to claim 1, wherein the lower portion has a plurality of slots, each slot having two slot walls, a width of the segments between two adjacent slot walls of two adjacent slots being at most (u+o)/3.

10. The sonotrode according to claim 1, wherein the sealing surface is bordered by two opposing side surfaces which extend essentially parallel to one another, and bordered by a front surface and a rear surface of the sonotrode, wherein the front surface is arranged, at least on the sealing surface, at an angle of less than 90° to the two opposing side surfaces.

11. The sonotrode according to claim 10, wherein the rear surface is also arranged, at least on the sealing surface, at an angle smaller than 90° to the two opposing side surfaces.

12. The sonotrode according to claim 1, wherein the upper portion of the sonotrode has at least one gap, wherein the gap is not arranged along an extension of the slot of the lower portion, or wherein the gap has a gap width that is larger than a spacing of the slot walls of the slot, or both.

13. The sonotrode according to claim 1, further comprising:
- a support provided for holding the sonotrode in the ultrasonic welding apparatus, the support arranged on the segments of the lower portion of the sonotrode.

14. A method for ultrasonic processing of a material, the method comprising the following steps:
- a) providing the sonotrode according to claim 1,
- b) providing a counter-tool having a sealing surface,
- c) arranging the material between the sealing surface of the sonotrode and the sealing surface of the counter-tool,
- d) exciting the sonotrode with an ultrasonic oscillation of wavelength $\lambda$,
- e) transferring an ultrasonic vibration from the sonostrode to the material.

15. The method according to claim 14, wherein $0.8(u+o)<\lambda<1.2(u+o)$.

16. The method according to claim 15, wherein $0.9(u+o)<\lambda<1.1(u+o)$.

17. The method according to claim 15, wherein $0.4\lambda<u<0.6\lambda$.

18. The method according to claim 17, wherein $\lambda/2=u$.

19. The method according to claim 14, wherein during step e) the material is passed at a feed rate of v>0 m/s in a feed direction between the sealing surface of the sonotrode and the sealing surface of the counter-tool.

* * * * *